UNITED STATES PATENT OFFICE.

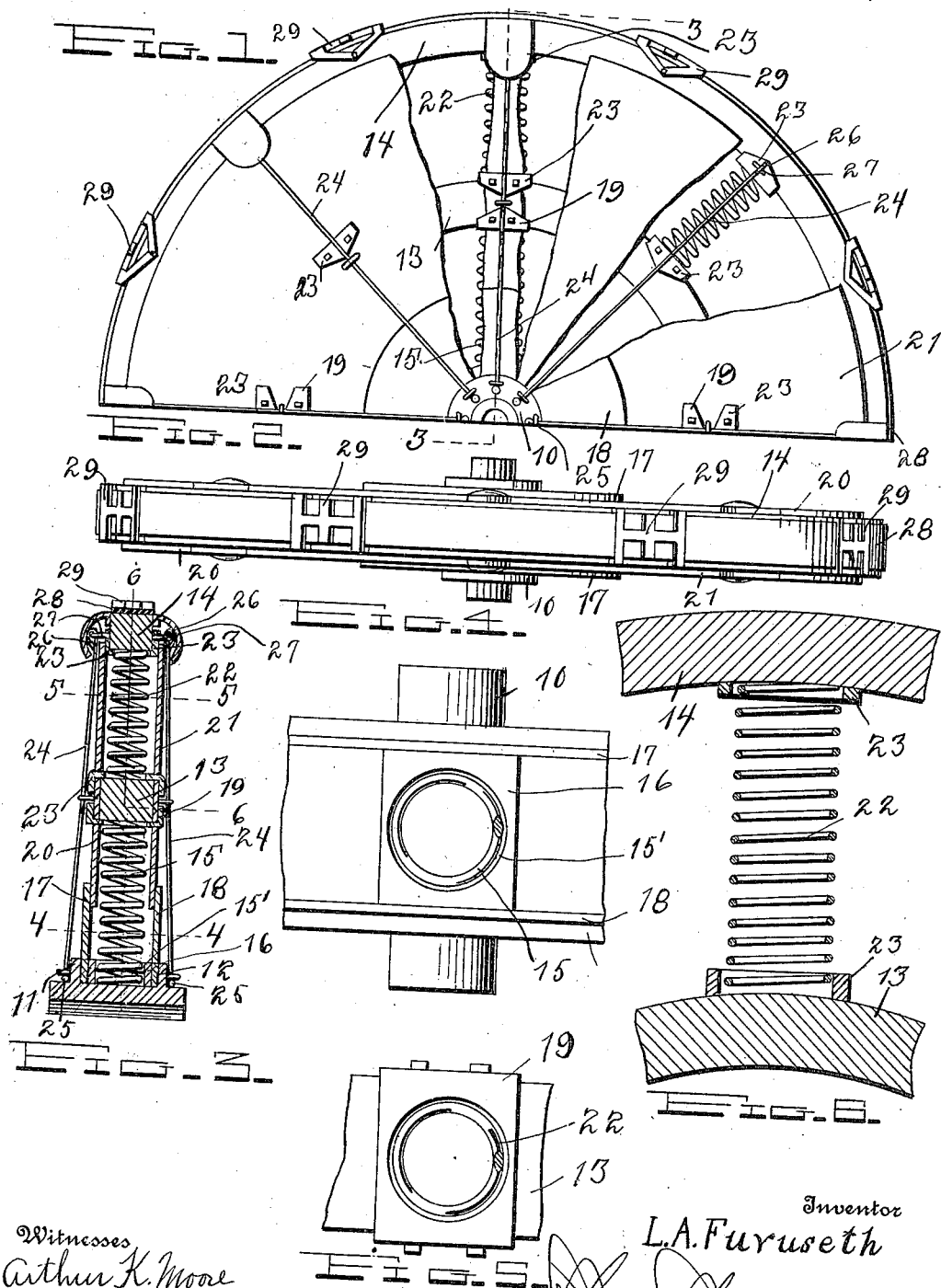

LOYD A. FURUSETH, OF BELMOND, IOWA.

SPRING-WHEEL.

1,090,703.

Specification of Letters Patent. Patented Mar. 17, 1914.

Application filed July 31, 1913. Serial No. 782,299.

*To all whom it may concern:*

Be it known that I, LOYD A. FURUSETH, a citizen of the United States, residing at Belmond, in the county of Wright, State of Iowa, have invented certain new and useful Improvements in Spring-Wheels; and I do hereby declare the following to be a full, clear, and exact description of the invention, such as will enable others skilled in the art to which it appertains to make and use the same.

This invention relates to spring wheels.

The object of the invention resides in the provision of a spring wheel which is particularly adapted for use in connection with automobiles and which will efficiently absorb shocks and jars incident to travel whereby the comfort of the occupants of the automobile is enhanced.

A further object of the invention resides in the provision of a spring wheel which will enable the use of pneumatic tires to be dispensed with and the disadvantages of such tire obviated.

With the above and other objects in view the invention consists in the detail of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a fragment of a spring wheel constructed in accordance with the invention, with certain portions broken away; Fig. 2, a plan view of what is shown in Fig. 1; Fig. 3, a section on the line 3—3 of Fig. 1; Fig. 4, a section on the line 4—4 of Fig. 3; Fig. 5, a section on the line 5—5 of Fig. 3, and Fig. 6, a section on the line 6—6 of Fig. 3.

Referring to the drawings the wheel is shown as comprising a hub 10 provided with spaced circumscribing flanges 11 and 12. Surrounding the hub 10 are intermediate and outer rims 13 and 14 respectively. Disposed between the hub 10 and the intermediate rim 13 are coil springs 15 the inner ends of which pass through openings 15' of plates 16 respectively which plates connect the circumscribing flanges 11 and 12. Secured to the inner sides of the flanges 11 and 12 are guard plates 17 and 18 respectively, lugs on the plates 16 passing through suitable openings in said guard plates. The outer ends of the springs 15 are held in place by angle plates 19 having side arms secured to the respective sides of the intermediate rim and their other arms extending across the inner side of said intermediate rim, said last named arms of the angle plates 19 being provided with opposed recesses in which the springs 15 are disposed. Also secured to the sides of the intermediate rim 19 are guard plates 20 and 21 the inner ends of which overlap the outer ends of the guard plates 17 and 18 respectively, while the outer ends thereof overlap the respective sides of the outer rim 14.

Interposed between the intermediate rim 13 and outer rim 14 is a plurality of coil springs 22 which are held in place by a plurality of angle plates 23 secured to the intermediate and outer rims respectively and of a construction identical with the angle plates 19.

Pivoted to the circumscribing flanges 11 and 12 are the inner ends of spokes 24, said spokes extending through eye members 25 secured to the flanges 11 and 12 and to the intermediate rim 13. The outer ends of these spokes 24 terminate in loops 26 which are engaged respectively with eye members 27 mounted on the outer rim 14. The connection between the outer ends of the spokes 24 and the outer rim 14 is adapted to be protected against injury by means of casings 28 detachably secured to the sides of the outer rim 14. The guide members 25 and 27 are of sufficient size to permit limited movement of the spokes 24 on their pivots so as to allow said spokes to move sufficiently to permit the necessary action of the springs 15 and 22 under the influence of jars and vibration.

The outer rim 14 is surrounded by a tire 28' which has detachably secured thereto at intervals cleats 29 having the shape of a cross and serving to prevent skidding and slipping of the wheel.

What I claim is:—

A spring wheel comprising a hub having spaced circumscribing flanges, inner and outer rims surrounding the hub, spokes having their inner ends pivotally connected to said flanges respectively, and their outer ends loosely engaged with the outer rim, eye members mounted on the inner rim in which said spokes are movably engaged respectively, springs interposed between the hub and inner rim, springs interposed between the inner rim and outer rim, guard plates carried by said flanges, and guard plates carried by the inner rim and having opposite portions disposed in overlapping relation to the guard plates carried by the flanges and outer rim respectively.

In testimony whereof, I affix my signature, in the presence of two witnesses.

LOYD A. FURUSETH.

Witnesses:
ABSALOM C. ERDAHL,
L. F. SIMERSON.

Copies of this patent may be obtained for five cents each, by addressing the "Commissioner of Patents, Washington, D. C."